United States Patent [19]

Gidley

[11] Patent Number: 4,715,443
[45] Date of Patent: Dec. 29, 1987

[54] BAFFLE SYSTEM FOR CONDUCTING WELL TREATING OPERATIONS

[75] Inventor: John L. Gidley, Houston, Tex.

[73] Assignee: Exxon Production Research Company, Houston, Tex.

[21] Appl. No.: 937,779

[22] Filed: Dec. 4, 1986

[51] Int. Cl.$^4$ .................. E21B 19/22; E21B 33/10; E21B 47/00

[52] U.S. Cl. .................. 166/250; 138/103; 138/116; 166/55.1; 166/66; 166/77; 166/242; 166/297; 166/305.1; 174/47

[58] Field of Search ........... 166/55, 55.1, 64, 65.1, 166/66, 77, 242, 244.1, 297, 298, 384, 387, 305.1, 250, 255; 138/103, 114–117, 37, 108; 174/47; 60/641.2

[56] References Cited

U.S. PATENT DOCUMENTS

| | | | |
|---|---|---|---|
| 2,713,421 | 7/1955 | Wigton | 138/115 X |
| 3,104,703 | 9/1963 | Rike et al. | 166/384 X |
| 3,110,753 | 11/1963 | Witort | 138/116 X |
| 3,116,793 | 1/1964 | McStravick | 166/384 X |
| 3,168,141 | 2/1965 | Lebourg | 166/313 X |
| 3,313,346 | 4/1967 | Cross . | |
| 4,120,347 | 10/1978 | Molnar | 138/116 X |
| 4,189,705 | 2/1980 | Pitts, Jr. | 166/66 X |
| 4,232,710 | 11/1980 | Gallo et al. | 138/37 X |
| 4,336,415 | 6/1982 | Walling | 174/47 |
| 4,374,530 | 2/1983 | Walling | 174/47 X |
| 4,611,656 | 9/1986 | Kendall, Jr. | 166/77 X |

Primary Examiner—George A. Suchfield

[57] ABSTRACT

A coiled baffle system, primarily for conducting well treating operations, is disclosed. The baffle system preferably comprises a baffle which is inserted into a tubing within a well bore to segment the tubing into a high pressure conduit and a low pressure conduit. The baffle system of the present invention may also be provided with electrical conductors for attachment to a variety of subsurface tools or sensors.

36 Claims, 8 Drawing Figures

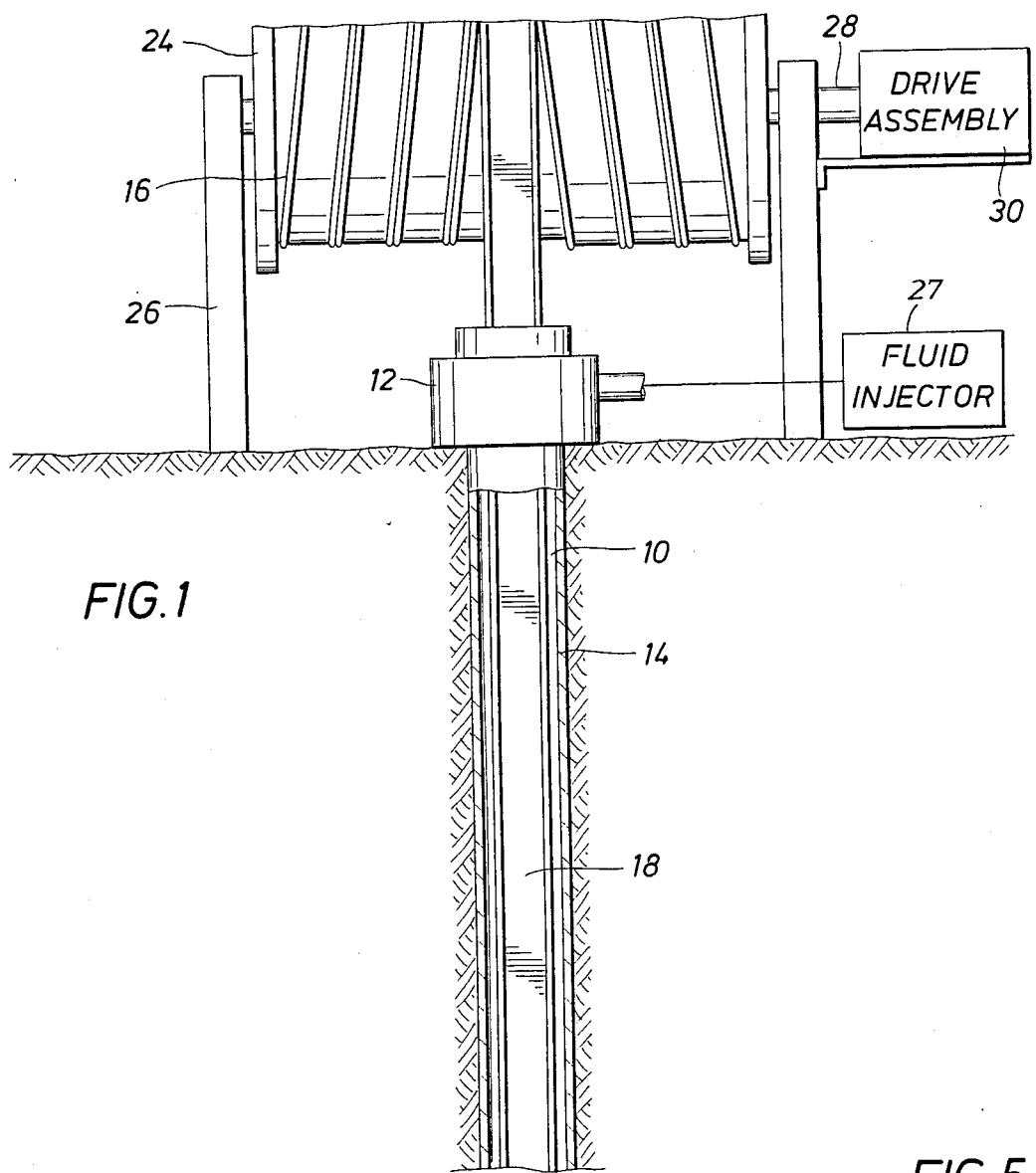
FIG. 1
FIG. 4
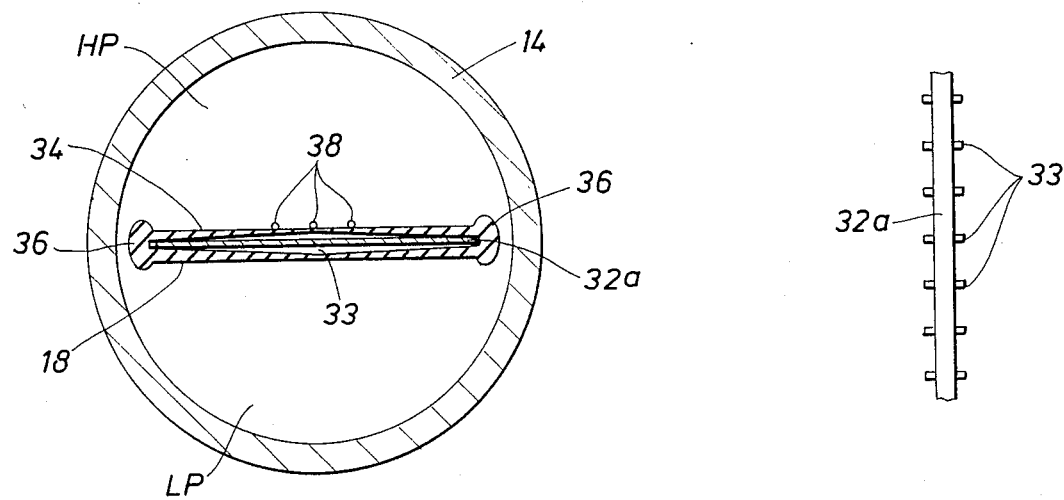
FIG. 5

BAFFLE SYSTEM FOR CONDUCTING WELL TREATING OPERATIONS

BACKGROUND OF THE INVENTION

The present invention relates generally to apparatus and methods for segmenting a tubular member into two conduits, primarily for conducting well treating operations; more particularly, it relates to a baffle system and method for its use in such well treating operations.

It has become common practice in the completion and workover of oil and gas wells to treat a formation by injecting fluids through perforations in a casing set is a well bore and into the formation. For example, acids may be injected to promote production (acidizing), surfactants may be injected to lower interfacial tension, alter formation wettability and break emulsions, cations or polymers may be injected to control clay swelling, and water or brine may be injected to pressurize a formation.

There are also occasions where the resident well bore fluid must be removed simply to facilitate operations. For example, in perforating the well it is desirable to evacuate the tubing to establish a lower pressure in the well bore than in the formation. This "underbalanced" perforating technique cleans the perforations by causing debris from the perforating gun and other sources to be blown out of the perforations and into the well bore where this debris can be carried to the surface.

The well bore is often filled with formation fluids or fluids left over from previous operations, hampering further injection operations. One common method of removing these fluids prior to injection operations is to pump them ahead of a treating fluid into the producing formation (the "bull-head" technique). Although this method has an advantage in that no additional equipment is required, it also has the substantial disadvantage that fluids potentially harmful to the formation must be pumped into the formation.

Well bore fluids for both injection and perforating operations may also be removed by gas lifting the fluids to the surface with nitrogen and a coiled tubing unit. In this operation, a flexible metal tube from a coil is lowered into the well bore inside existing tubing. Once the end of the tube is at the desired depth, a displacing fluid, usually nitrogen, is injected into the well bore through the tube to displace the well bore fluid up the annulus between the injection tube and the well bore tubing. While this method removes the unwanted well bore fluids and minimizes potential damage to the formation from the harmful components of the well bore fluid, it also requires that additional equipment be brought on site and that a nitrogen source and compressor be used in displacing the well bore fluids.

Downhole information cannot easily be gathered during the injection operations of the prior art methods. Thus, it is difficult to analyze the well treating operation as it progresses. For example, changing formation permeability during the treatment cannot be readily measured by the prior art methods except through surface pressure measurements. Uncertainties in the average fluid density within the well bore plus friction pressure drops during the injection operation make the observed surface pressures less reliable than bottom hole pressure measurements.

It is, therefore, an object of the present invention to provide apparatus and methods for conducting well treating operations whereby the well bore fluids can be displaced from the well bore with minimum potential damage to the producing formation.

It is a further object of the present invention to provide apparatus and methods for conducting well treating operations whereby only a small amount of additional equipment is required on site to perform such operations.

It is a still further object of the present invention to provide apparatus and methods which allow downhole measurements to be made during the operations to facilitate the analysis of the treating operations as they progress.

SUMMARY OF THE INVENTION

The present invention provides a method and apparatus for segmenting a tubular member into two conduits by use of a baffle system. The baffle is inserted into the tubular member substantially coaxial with the tubular member. The baffle includes a core, a sleeve surrounding the core, and sealing means for forming a seal between the two conduits so that fluid injected into one conduit will not leak into the other conduit. The baffle core is made of a substance such as steel which is strong enough to withstand a pressure differential between the two conduits. However, the core must be flexible, as the baffle is preferably coiled about a spool, and inserted into the tubular member by uncoiling the spool. When fluid is injected into the tubular member, the sealing means will engage the inner surface at the tubular member to form a seal.

The baffle system is especially suitable for use in treating operations in a well bore. Fluid may be injected into tubing via one of the conduits formed by the baffle at a sufficient pressure to force fluids already in the well bore out of the tubing via the other conduit.

BRIEF DESCRIPTION OF THE DRAWINGS

FIGS. 1 and 1A are schematic elevational views of a baffle system in accordance with the present invention in place within tubing in a well bore for conducting well treating operations.

FIG. 4 is an overhead cross-sectional view of another embodiment of the baffle in accordance with the present invention taken along line 2—2 of FIG. 1A.

FIG. 5 is a side elevation of an embodiment of the core of the baffle of FIG. 4.

DETAILED DESCRIPTION OF THE PREFERRED EMBODIMENT

Figure 1A:
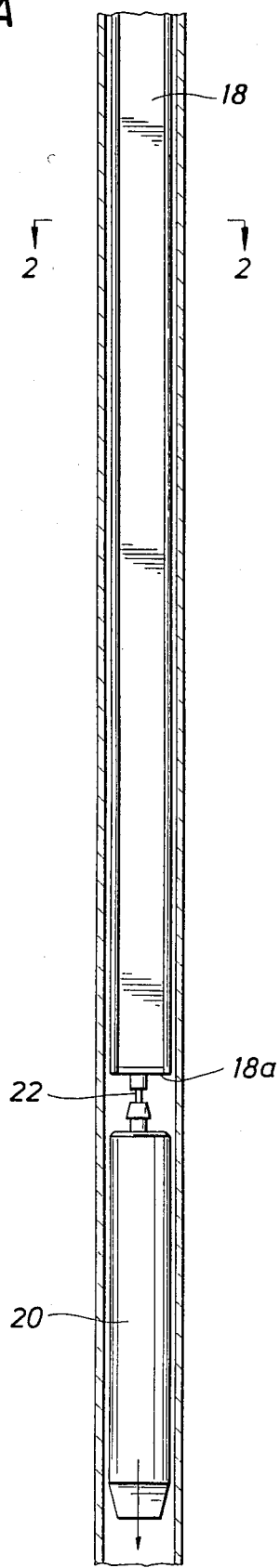

FIGS. 1 and 1A show the baffle system of the present invention in place within a well bore. A well bore 10 has a wellhead 12 placed thereover and a tubular member such as tubing 14 therein. Tubing 14 will usually be a tubing string. A spool assembly 16 includes a spool 24 and baffle 18 coiled about spool 24. Baffle 18 is positionably inserted through wellhead 12 and into tubing 14 to segment tubing 14 into a first conduit HP and a second conduit LP as detailed below.

Spool assembly 16 may be any conventional spool assembly which is adaptable for inserting baffle 18 through wellhead 12 and into well bore 10. Spool 24 is mounted on a support 26 by axle 28 centrally extending through spool 24. A drive assembly 30 such as a gear motor or an electric motor drive is attached to axle 28 for providing rotational impetus to spool 24 to insert or withdraw baffle 18 from well bore 10. Spool assembly 16 may optionally be provided with a directing assembly (not shown) for facilitating the insertion and removal of baffle 18 into and through wellhead 12 by directing baffle 18 into wellhead 12 as it is coiled and uncoiled from spool 24.

A downhole tool 20 may be attached to the downhole end 18a of baffle 18. Tool 20 may be any one of a number of well known downhole tools depending upon the desired operation, including perforating tools and sensing instruments, to measure a variety of downhole parameters, for example, to measure changing formation permeability. An electrical connector 22 is shown between baffle 18 and tool 20 for communicating with and providing power to tool 20.

Fluid injector 27 is preferably located outside well bore 10. Fluid injector 27 must be able to inject fluids at a pressure sufficient for sealing means 36 to engage inner surface 14a of tubing 14. Fluid injector 27 may be adapted to inject a variety of fluids, depending on the particular treatment operation to be conducted.

Figure 2:
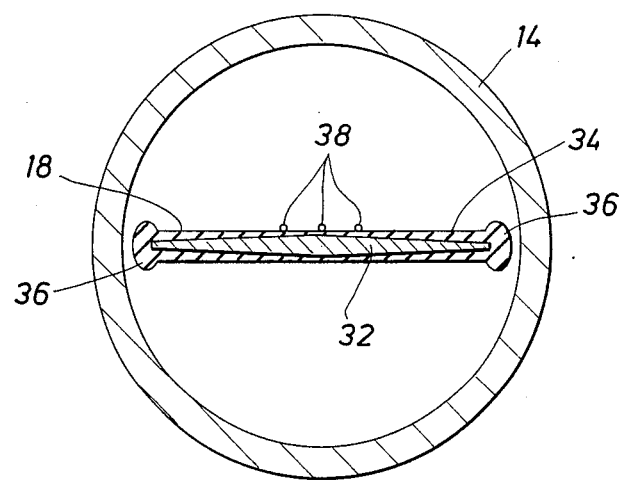
FIG. 2 is an overhead cross-sectional view of the baffle in accordance with the present invention taken along line 2—2 of FIG. 1A.

Referring now to FIG. 2, there is illustrated an overhead cross-sectional view of an embodiment of baffle 18 within tubing 14, taken along line 2—2 of FIG. 1A. As depicted in FIG. 2, baffle 18 generally comprises a core 32, a sleeve 34 surrounding core 32, and sealing means 36 on the ends of sleeve 34.

Core 32 will usually be inserted coaxial with tubing 14. Core 32 must resist deformation from pressure differentials between first conduit HP and second conduit LP up to several thousand pounds per square inch. Core 32 should be sufficiently flexible to allow coiling and uncoiling from spool 24 of spool assembly 16. Core 32 is preferably constructed from solid sheets of steel or aluminum but the material selected for core 32 will depend upon the specific operating and well bore conditions, particularly the pressure conditions.

Core 32 is surrounded by sleeve 34. Sleeve 34 preferably comprises an elastomer which is either molded over core 32 or through which core 32 is inserted. The elastomer of sleeve 34 must be deformable, yet resilient, in the presence of temperatures, pressures, and fluids encountered within the well bore or during well treating operations. The elastomer may be selected from conventional rubbers, plastics, or combinations thereof which are suitable for the particular environment and operations to be conducted.

Sealing means 36 are preferably integral with the ends of sleeve 34. When sealing means 36 engage the inner surface 14a of tubing 14, sealing means 36 prevent the flow of fluids from first conduit HP to second conduit LP. As depicted in FIG. 2, sealing means 36 comprise ovular extensions from the ends of sleeve 34 which, when urged or engaged to the inner wall 14a of tubing string 14, deform to form the seal. Sealing means 36 may be any one of a number of conventional seals such as an O-ring assembly or a chevron seal.

Baffle 18 may further be provided with electrical conductors 38 to provide power to, and communicate with, downhole tool 20. In FIG. 2, conductors 38 are placed on the exterior of sleeve 34. However, conductors 38 may be placed between sleeve 34 and core 32, may extend through core 32, or may be placed within baffle 18.

Figure 3:
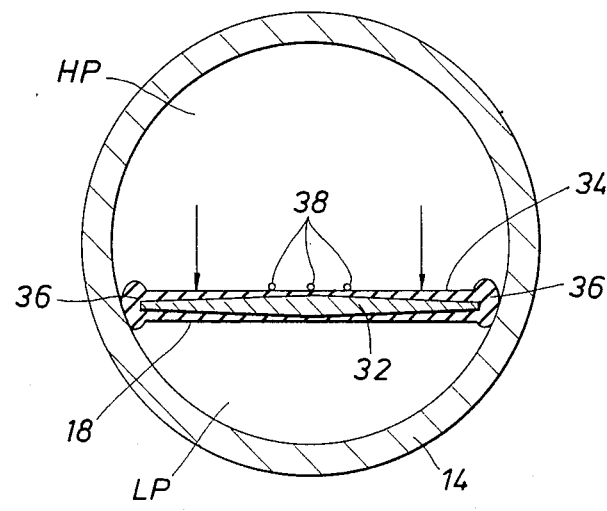
FIG. 3 is an overhead cross-sectional view of the baffle of FIG. 2 with the baffle in sealing engagement with the inner wall of the tubing.

The preferred embodiment of the baffle system may be used in well treating operations as follows. Baffle 18, which includes core 32, sleeve 34, and sealing means 36, is positionably inserted into tubing 14 in well bore 10 so that baffle 18 is substantially coaxial with tubing 14. Baffle 18 is uncoiled from spool 24. Tubing 14 is segmented by baffle 18 into a first conduit HP and second conduit LP. A well treatment fluid can then be injected from fluid injector 27 into first conduit HP. The fluid should be injected at a pressure sufficient to force sealing means 36 to engage the inner surface 14a of tubing 14, to form a fluid seal between first conduit HP and second conduit LP. FIG. 3 shows the baffle system following formation of the fluid seal. If desired, the fluid may be injected at a pressure sufficient to displace fluid already present in well bore 10 ("well bore fluid") upwardly through second conduit LP and out wellhead 12. This results in the well bore fluid being removed and replaced by the desired fluid prior to further operations.

Slight leaks between first conduit HP and second conduit LP will not hinder the removal of fluid from second conduit LP. As long as a seal is maintained sufficiently to allow a pressure differential between first conduit HP and second conduit LP, substantially the entire quantity of well bore fluid will be removed.

FIGS. 4 and 5 illustrate another embodiment of baffle 18. As shown in FIGS. 4 and 5, core 32a has a generally rectangular shape. Core 32a has a plurality of support ribs 33 spaced along its length for additional support to resist deformation in uses where there is a pressure differential between first conduit HP and second conduit LP. Support ribs 33 are preferably thin, triangular members which are mounted to core 32a. Support ribs 33, however, may be constructed of any shape and size suitable for providing the additional support. FIG. 4 shows electrical conductors 38 placed on the exterior of sleeve 34.

Figure 6:
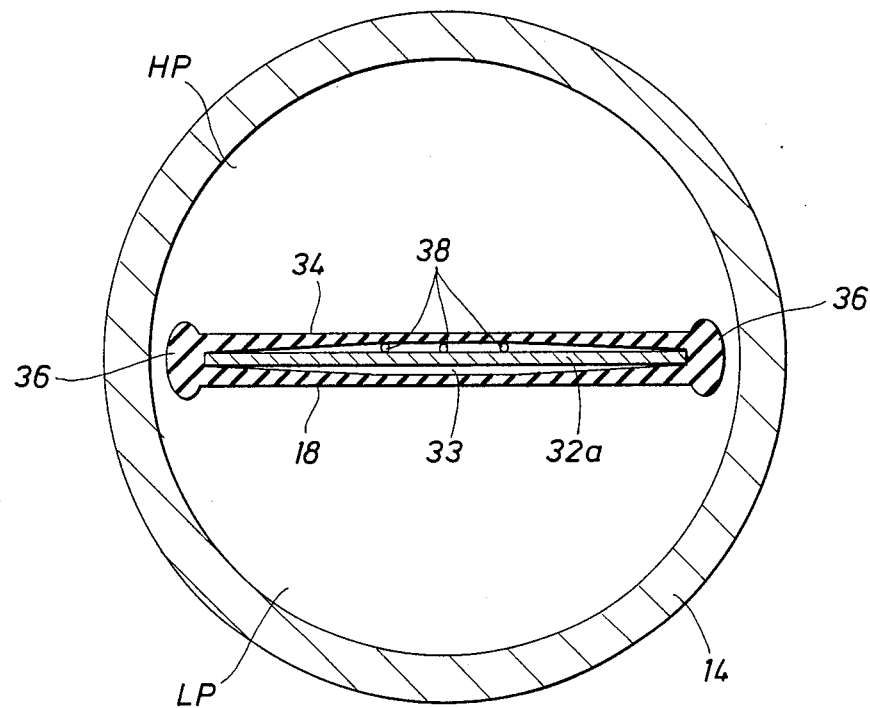
FIGS. 6 and 7 show the baffle embodiment of FIG. 4 which has electrical conductors located in alternative positions.
Figure 7:
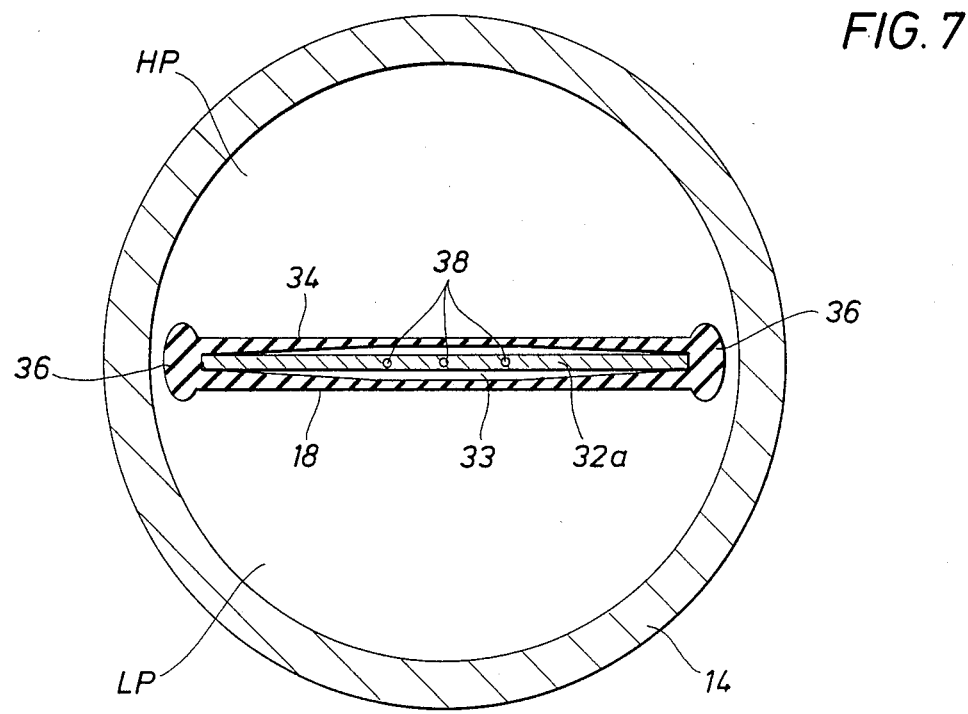

FIGS. 6 and 7 show alternative embodiments of the baffle system of FIG. 4. FIG. 6 shows electrical conductors 38 interposed between sleeve 34 and core 32. FIG. 7 shows electrical conductors 38 located within core 32.

Following completion of an injection process, pressure in first conduit HP and second conduit LP may be equalized by decreasing the injection rate of the well treatment fluid. If the pressure in second conduit LP exceeds the pressure in first conduit HP, the fluid seal will be broken. An afterflush may be desired in some cases to displace well treatment fluid out via second conduit LP or into the formation.

Upon completion of well treatment operations, baffle 18 may be removed from well bore 10 through wellhead 12 by use of spool assembly 16. Baffle 18 may be recoiled on spool 24.

The baffle assembly and method of use provide an effective means of removing resident well bore fluids while minimizing potential formation damage from the injection of the resident fluids back into the formation.

Further, the baffle assembly and method of use requires only a minimum of extra equipment be transported on site, that is, only the spool assembly with the baffle coiled thereon need be brought to the well.

Still further, the baffle assembly may be provided with electrical conductors for attachment to a variety of downhole tools and sensors for performing a variety of downhole operations and measuring a variety of downhole parameters simultaneously with or subsequent to the removal of the resident well bore fluids.

The principle of the invention and the best mode contemplated and applying that principle have been described. It is understood that the foregoing is illustrative only and that other means and techniques can be employed without departing from the true scope of the invention defined in the following claims.

I claim:

1. A baffle system for segmenting a tubular member into a first conduit and a second conduit, said baffle system capable of withstanding a pressure differential between said first conduit and said second conduit, comprising:
 a core positionably insertable into said tubular member substantially coaxial with said tubular member to segment said tubular member into a first conduit and a second conduit;
 a sleeve surrounding said core; and
 sealing means extending from said sleeve to be engageable with the inner surface of said tubular member for forming a seal between said first conduit and said second conduit.

2. A baffle system for segmenting tubing in a well bore into a first conduit and a second conduit, said baffle system capable of withstanding a pressure differential between said first conduit and said second conduit, comprising:
 a core positioned substantially coaxial with said tubing in said well bore to segment said tubing into a first conduit and a second conduit;
 a sleeve surrounding said core;
 sealing means extending from said sleeve to be engageable with the inner surface of said tubing for forming a seal between said first conduit and said second conduit.

3. The baffle system of claim 2 wherein said core is sufficiently flexible to be inserted into said well bore from a spool.

4. The baffle system of claim 2 wherein said core comprises steel.

5. The baffle system of claim 2 wherein said sleeve comprises a deformable elastomer material.

6. The baffle system of claim 2 further comprising an electrical conductor attached to said sleeve.

7. The baffle system of claim 2 further comprising an electrical conductor interposed between said sleeve and said core.

8. The baffle system of claim 2 further comprising an electrical conductor located within said core.

9. The baffle system of claim 2 wherein said sealing means is substantially integral with a first end and a second end of said sleeve.

10. The baffle system of claim 2 wherein said core includes support ribs.

11. The baffle system of claim 2 where said sealing means comprises a first deformable ovular extension and a second deformable ovular extension which extend from a first end and a second end of said sleeve.

12. The baffle system of claim 2 wherein a data gathering tool is attached to said baffle.

13. An apparatus for conducting well treating operations in a tubing within a well bore, comprising:
 a spool;
 a baffle which is sufficiently flexible to be coiled and uncoiled about said spool and which is positionably insertable into said tubing substantially coaxial with said tubing to segment said tubing into a first conduit and a second conduit, said baffle comprising a core, a sleeve surrounding said core, and sealing means extending from said sleeve to be engageable with the inner surface of said tubing; and
 a fluid injector located outside said well bore for injecting a fluid into said tubing within said first conduit at a pressure sufficient for said sealing means to engage an inner surface of said tubing to form a seal between said first conduit and said second conduit and for resident well bore fluids to be forced from said tubing through said second conduit.

14. The apparatus of claim 13 wherein said baffle core comprises steel.

15. The apparatus of claim 13 wherein said baffle sleeve comprises a deformable elastomer material.

16. The apparatus of claim 13 further comprising an electrical conductor attached to said baffle sleeve.

17. The apparatus of claim 13 further comprising an electrical conductor interposed between said baffle sleeve and said baffle core.

18. The apparatus of claim 13 further comprising an electrical conductor located within said core.

19. The apparatus of claim 13 wherein said sealing means is substantially integral with a first end and a second end of said sleeve.

20. The apparatus of claim 13 wherein said core includes support ribs.

21. The baffle system of claim 13 wherein said sealing means comprises a first deformable ovular extension and a second deformable ovular extension which extend from a first end and a second end of said sleeve.

22. The baffle system of claim 13 wherein a data gathering tool is attached to said baffle.

23. The baffle system of claim 13 wherein a perforating tool is attached to said baffle.

24. A method for segmenting tubing in a well bore, comprising the steps of:
 positionably inserting a baffle into said tubing so said baffle is substantially coaxial with said tubing to segment said tubing into a first conduit and a second conduit, said baffle comprising a core, a sleeve surrounding said core, and sealing means extending from said sleeve to be engageable with the inner surface of said tubing; and
 injecting a fluid into said first conduit at a sufficient pressure so that said sealing means of said baffle contacts the inner surface of said tubing to form a fluid seal between said first conduit and said second conduit.

25. A method for conducting well treating operations in a well bore, comprising the steps of:
 uncoiling a baffle from a spool to positionably insert said baffle into a tubing within said well bore so said baffle is substantially coaxial with said tubing to segment said tubing into a first conduit and a second conduit, said baffle comprising a core, a sleeve surrounding said core, and sealing means extending from said sleeve to be engageable with the inner surface of said tubing; and
 injecting a well treatment fluid into said first conduit at a sufficient pressure so that said sealing means of said baffle contacts the inner surface of said tubing to form a fluid seal between said first conduit and said second conduit.

26. The method of claim 25 wherein said well treatment fluid is injected at a sufficient pressure so that a quantity of fluid present in the well bore prior to injection of said well treating fluid is forced into said second conduit.

27. The method of claim 26 further comprising the step of removing by said second conduit the said quantity of fluids present in the well bore prior to said well treating operations.

28. The method of claim 25 further comprising the step of gathering data from said well bore with a data gathering tool attached to said baffle.

29. The method of claim 25 further comprising the step of perforating said tubing with a perforating tool attached to said baffle.

30. The method of claim 25 wherein said baffle core comprises steel.

31. The method of claim 25 wherein said baffle sleeve comprises a deformable elastomer material.

32. The method of claim 25 wherein said baffle further comprises an electrical conductor attached to said sleeve.

33. The method of claim 25 wherein said baffle further comprises an electrical conductor interposed between said sleeve and said core.

34. The method of claim 25 wherein said baffle further comprises an electrical conductor located within said core.

35. The method of claim 25 wherein said sealing means is substantially integral with a first end and a second end of said sleeve.

36. The method of claim 25 wherein said core includes support ribs.

* * * * *